US012494731B2

United States Patent
Liu et al.

(10) Patent No.: US 12,494,731 B2
(45) Date of Patent: Dec. 9, 2025

(54) CIRCUIT AND METHOD FOR DRIVING SPIM

(71) Applicant: Shanghai Ruking Intelligent Control Technologies Co.,Ltd, Shanghai (CN)

(72) Inventors: Zhanjun Liu, Shanghai (CN); Shaocai Ma, Shanghai (CN)

(73) Assignee: Shanghai Ruking Intelligent Control Technologies Co., Ltd, Shanghai (CN)

( * ) Notice: Subject to any disclaimer, the term of this patent is extended or adjusted under 35 U.S.C. 154(b) by 169 days.

(21) Appl. No.: 18/566,106

(22) PCT Filed: Jul. 23, 2021

(86) PCT No.: PCT/CN2021/108169
§ 371 (c)(1),
(2) Date: Dec. 1, 2023

(87) PCT Pub. No.: WO2022/252370
PCT Pub. Date: Dec. 8, 2022

(65) Prior Publication Data
US 2024/0250629 A1     Jul. 25, 2024

(30) Foreign Application Priority Data

Jun. 4, 2021    (CN) .......................... 202110625151.6
Jun. 4, 2021    (CN) .......................... 202121243396.4

(51) Int. Cl.
*H02P 27/06*     (2006.01)
*H02P 21/22*     (2016.01)
(Continued)

(52) U.S. Cl.
CPC .............. *H02P 27/06* (2013.01); *H02P 21/22* (2016.02); *H02P 21/34* (2016.02); *H02P 25/04* (2013.01)

(58) Field of Classification Search
CPC .......... H02P 21/22; H02P 21/34; H02P 25/04; H02P 27/06
See application file for complete search history.

(56) References Cited

U.S. PATENT DOCUMENTS 5,146,147 A   *   9/1992   Wills ...................... H02P 25/04
                                                   363/43
8,305,026 B2 *   11/2012   Fei ......................... H02P 25/20
                                                   318/773

(Continued)

FOREIGN PATENT DOCUMENTS

CN           2061349 A       8/1990
CN           1808888 A       7/2006
(Continued)

*Primary Examiner* — Thai T Dinh
(74) *Attorney, Agent, or Firm* — IPRTOP LLC

(57) ABSTRACT

A circuit and a method for driving a SPIM are provide. The circuit comprises a driver and an alternating-current unit. The driver comprises a rectifying unit, a direct-current bus, a first inverter unit and a second inverter unit. The rectifying unit is connected to the direct-current bus, and the direct-current bus is respectively connected to the first inverter unit and the second inverter unit. The first inverter unit is connected to a first winding of the SPIM through a first switch, and the second inverter unit is connected to a second winding of the SPIM. The alternating-current unit comprises an input alternating-current power, a second switch and a capacitor. The input alternating-current power is connected to the first winding and the rectifying unit. The method can drive the SPIM in both variable frequency and industrial frequency, and hot switch from variable-frequency to industrial-frequency without interruption.

14 Claims, 4 Drawing Sheets

(51) Int. Cl.
*H02P 21/34* (2016.01)
*H02P 25/04* (2006.01)

(56) References Cited

U.S. PATENT DOCUMENTS

| | | | | |
|---|---|---|---|---|
| 9,093,942 B2* | 7/2015 | Anderson | ................. | H02P 1/44 |
| 9,806,660 B1* | 10/2017 | Chretien | ................. | H02P 25/04 |
| 10,715,063 B2* | 7/2020 | Tamitsuji | ................. | H02P 6/12 |
| 2003/0043606 A1* | 3/2003 | Lipo | ................. | H02P 1/44 |
| | | | | 363/41 |
| 2021/0313918 A1* | 10/2021 | Chretien | ............... | H02P 25/022 |

FOREIGN PATENT DOCUMENTS

| | | | |
|---|---|---|---|
| CN | 102185557 | A | 9/2011 |
| CN | 206432928 | Y | 8/2017 |
| CN | 112865658 | A | 5/2021 |

* cited by examiner

CIRCUIT AND METHOD FOR DRIVING SPIM

FIELD OF TECHNOLOGY

The present disclosure relates to single-phase induction motors (SPIMs), and in particular, to a circuit and a method for driving a SPIM.

BACKGROUND

SPIMs are induction motors that use a single-phase alternating-current power source. They have the advantages of being easy to use, widely applicable, structurally simple, inexpensive, quiet, and minimally disruptive to radio systems because they only require single-phase alternating-current power. As a result, SPIMs are often used in household appliances and small power machinery with low power, such as electric fans, washing machines, refrigerators, air conditioners, range hoods, electric drills, medical equipment, small fans, and household water pumps.

In existing technology, SPIMs usually consist of a stator, rotor, bearing, casing, end cover, etc. Because the output power of a SPIM is not large, the rotor of the SPIM is usually of a squirrel-cage type, where there is a set of working windings on the stator, called the main winding (hereinafter, M winding), which can only produce positive and negative alternating pulse magnetic fields in the air gap of the motor and cannot produce a rotating magnetic field, and cannot produce starting torque. To generate a rotating magnetic field in the air gap of the motor, there also needs to be a set of auxiliary windings (hereinafter, A winding) on the stator, in which case, because the magnetic field generated by A winding and the magnetic field generated by M winding are synthesized to produce a rotating magnetic field in the air gap of the motor, the motor is able to produce starting torque, enabling the rotor to rotate by itself.

A starting mode of an existing SPIM is shown in FIG. 1. In this mode, the starting current of M winding is too large, which is 5-10 times the rated current of the SPIM, causing the SPIM to overheat and waste energy.

After the SPIM starts, it enters an operating state. At this time, the capacitor(s) can maintain the connection mode shown in FIG. 1, or it can adopt the partial connection mode shown in FIG. 2, or it can adopt the M-winding-only connection mode shown in FIG. 3. However, in existing technology, because the SPIM is not so designed that the starting and operating of the SPIM both satisfy an optimal working point, the motor magnetic flux is generally elliptical, causing torque and speed fluctuations, resulting in large energy consumption. At the same time, the SPIM cannot be adjusted and controlled to be at optimal working points based on various load situations, which also results in extra energy consumption.

When the SPIM adopts power electronic devices, it can adopt various operation modes shown in FIGS. 4-6, which have the advantages of small starting current, stable magnetic flux control, small torque and speed fluctuations, low energy loss, and stable speed control. However, in this case, all the energy of the SPIM comes from the driver, which necessitates the driver bearing all the motor power.

SUMMARY

The present disclosure provides a circuit and a method for driving a SPIM to achieve a smaller starting current and lower energy loss and can realize variable-frequency operation of the SPIM. Moreover, the driver only needs to provide part of the energy required by the SPIM in grid industrial-frequency operation modes, and can realize the hot switching from drive control to grid industrial-frequency control.

The circuit for driving the SPIM comprises a driver and an alternating-current unit. The driver comprises a rectifying unit, a direct-current bus, a first inverter unit and a second inverter unit. The rectifying unit is connected to the direct-current bus, and the direct-current bus is respectively connected to the first inverter unit and the second inverter unit. The first inverter unit is connected to a first winding of the SPIM through a first switch, and the second inverter unit is connected to a second winding of the SPIM. The alternating-current unit comprises an input alternating-current power, a second switch and a capacitor. The input alternating-current power is connected to the first winding through the second switch and the capacitor, and is connected to an input terminal of the rectifying unit.

In an embodiment of the present disclosure, the first inverter unit and the second inverter unit comprise two-level inverters or three-level inverters.

In an embodiment of the present disclosure, the rectifying unit comprises a single-phase uncontrolled rectifying circuit, a single-phase PWM rectifier, a single-phase BOOST rectifying circuit, a totem-pole rectifying circuit, or a voltage multiplier rectifying circuit.

The method for driving the SPIM is applied to any one of the circuits mentioned above and comprises: connecting the first switch and disconnecting the second switch when the SPIM is started or under a variable-frequency control state; driving the first winding of the SPIM based on the first inverter unit, and driving the second winding of the SPIM based on the second inverter unit.

In an embodiment of the present disclosure, the method further comprises: when the SPIM is switched from a variable frequency to an industrial frequency, or when a switch transistor of the first inverter unit is damaged, disconnecting the first switch, connecting the second switch, driving the first winding based on the input alternating-current power, and driving the second winding based on the second inverter unit.

In an embodiment of the present disclosure, the first inverter unit and the second inverter unit comprise two-level inverters or three-level inverters.

In an embodiment of the present disclosure, the rectifying unit comprises a single-phase uncontrolled rectifying circuit, a single-phase PWM rectifier, a single-phase BOOST rectifying circuit, a totem-pole rectifying circuit, or a voltage multiplier rectifying circuit.

As described above, the present disclosure has the following advantages:

(1) The motor can be started using inverter units, and soft start can be achieved using vector control. This reduces the starting current. The first winding and the second winding currents cooperate to form a circular magnetic field inside the motor, which reduces motor loss and improves motor efficiency, thereby providing small torque and speed fluctuations, reduced motor wear, and improved motor life.

(2) In the inverter unit mode, the motor can achieve variable-frequency operation.

(3) When the magnetic field speed of the motor reaches the grid frequency, S1 can be disconnected and S2 can be connected to realize the hot switching from variable-frequency drive to industrial-frequency drive. This allows the driver and the grid to jointly control the motor operation. By adjusting the second winding current to cooperate with the first winding current to form a circular magnetic field, the speed fluctuations of the motor are small and the loss is small. In this mode, the grid and the inverter both bear part of the energy required by the motor.

(4) When the switch transistor of the inverter connected to the first winding is damaged, the motor can be started by disconnecting S1, connecting S2, and controlling the second winding current to cooperate with the first winding current to form a circular magnetic field. The whole process has small and controlled current, and the inverter only bears part of the energy required for motor operation.

REFERENCE NUMERALS

Figure 1:
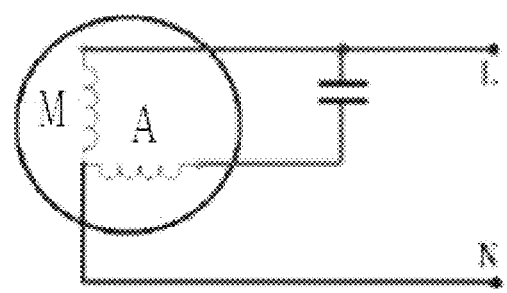
FIG. 1 shows a schematic diagram of a circuit for starting a SPIM according to an embodiment in the prior art.
Figure 2:
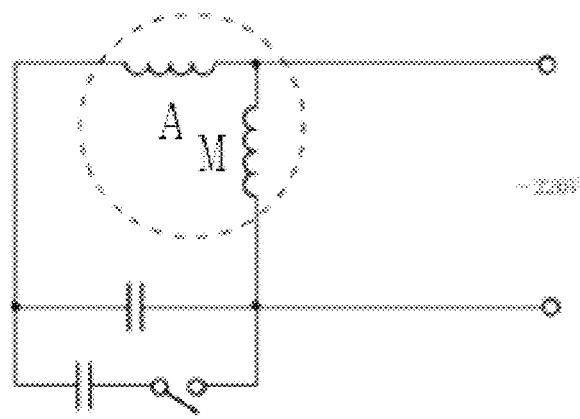
FIG. 2 shows a schematic diagram of a circuit for running the SPIM according to a first embodiment in the prior art.
Figure 3:
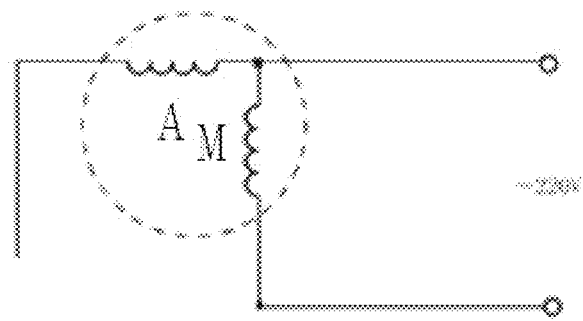
FIG. 3 shows a schematic diagram of a circuit for running the SPIM according to a second embodiment in the prior art.
Figure 4:
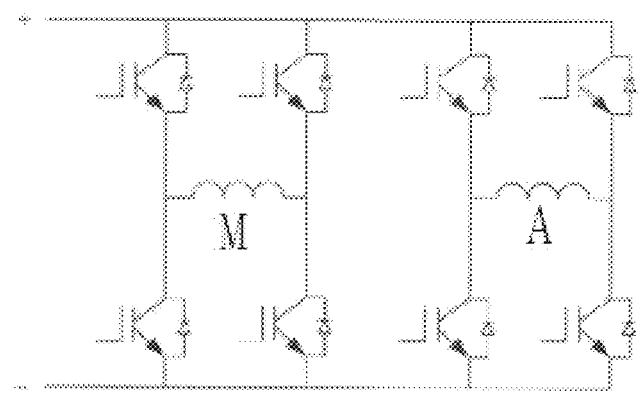
FIG. 4 shows a schematic diagram of a circuit for controlling the SPIM according to a third embodiment in the prior art.
Figure 5:
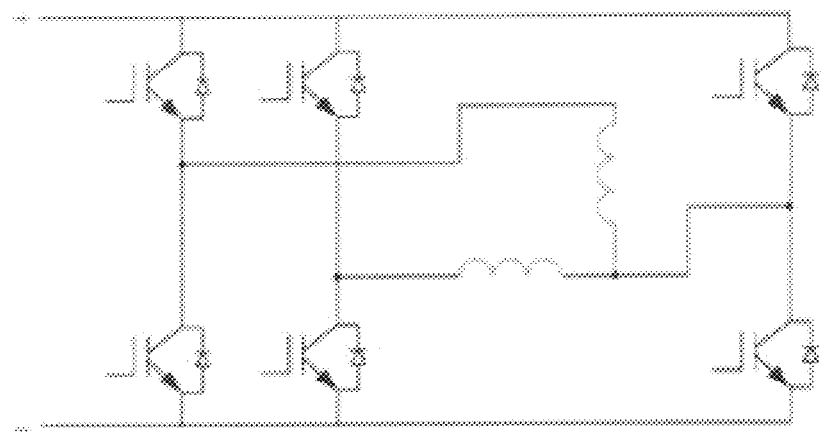
FIG. 5 shows a schematic diagram of a circuit for controlling the SPIM according to a fourth embodiment in the prior art.
Figure 6:
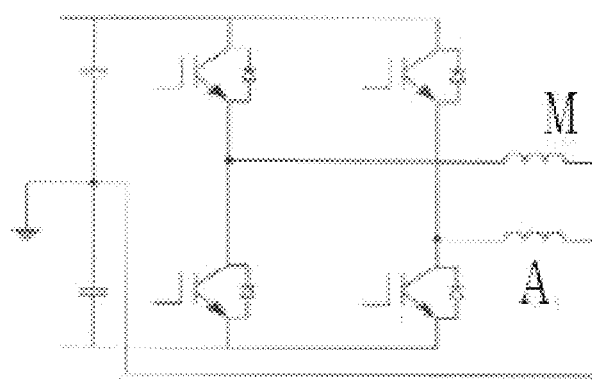
FIG. 6 shows a schematic diagram of a circuit for controlling the SPIM according to a fifth embodiment in the prior art.

1 Driver
11 Rectifying unit
12 Direct-current bus
13 First inverter unit
14 Second inverter unit
15 First switch
2 Alternating-current unit
21 Input alternating-current power
22 Second switch
23 Capacitor
3 SPIM
31 First winding
32 Second winding

DETAILED DESCRIPTION

The embodiments of the present disclosure will be described below. Those skilled can easily understand disclosure advantages and effects of the present disclosure according to contents disclosed by the specification.

It should be noted that the structure, ratio, size, etc. shown in the accompanying drawings in this specification are only used to illustrate the content disclosed in the specification for the understanding and reading of those familiar with this technology, and are not intended to limit the implementation of the present invention. Any structural modification, proportional relationship change or size adjustment should still fall within the scope of the present disclosure, given that no effect and objective achievable by the present disclosure are hindered. Terms such as "upper", "lower", "left", "right", "middle", and "a" used in this specification are only for ease of description, and they are not intended to limit the scope of implementation of the present invention. Any change or adjustment of corresponding relative relationships without any substantial technical change should be regarded as within the scope of the implementation of the present disclosure.

In the present disclosure, by connecting the second winding and the first winding of the SPIM to the inverter unit respectively and connecting the first winding to the grid based on the switching circuit, the SPIM can be controlled by the driver to run at variable frequency, and the SPIM can also be controlled to run at the industrial frequency (or, fixed frequency) when the first winding is worked with the alternating-current unit and the second winding is worked with the inverter unit, thereby achieving the hot switching from drive control to grid industrial-frequency control, and at the same time achieving a smaller starting current and lower energy loss, which is meaningful in practice.

Figure 7:
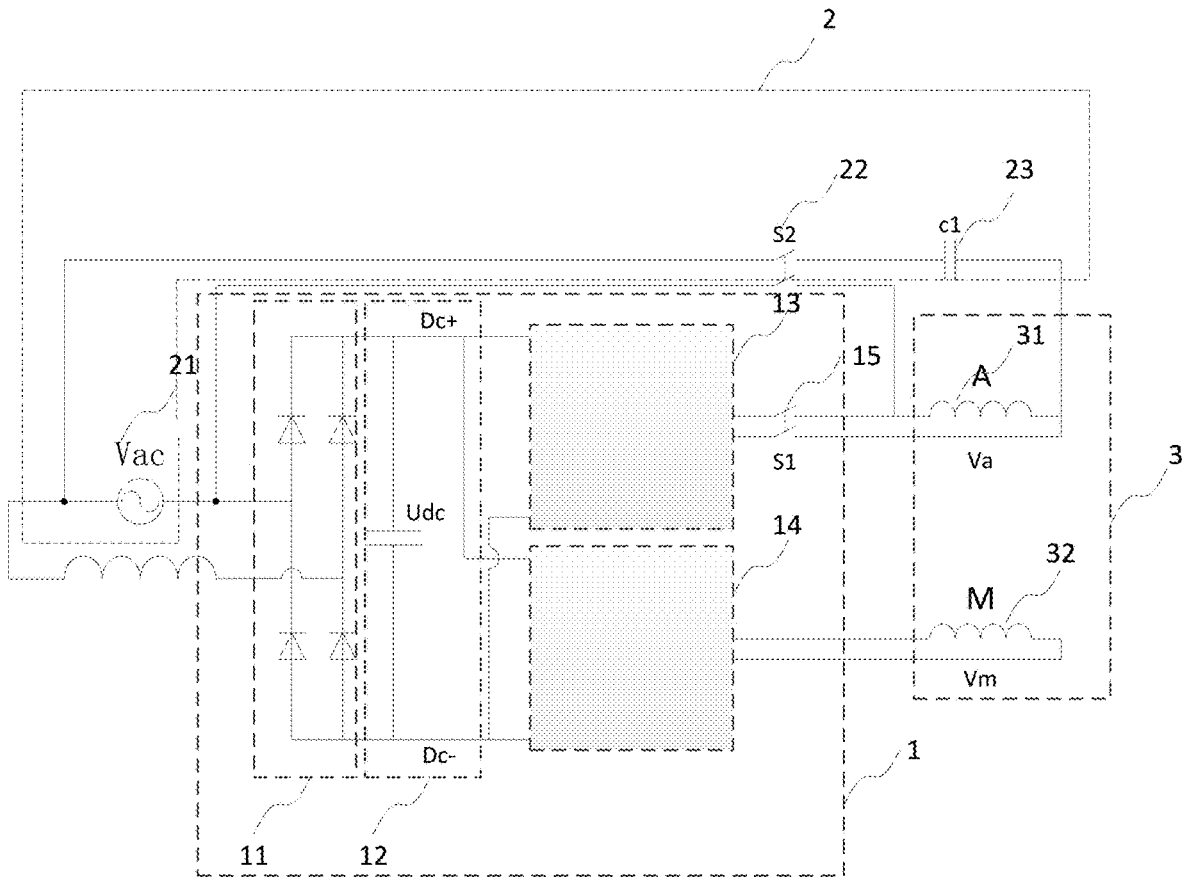
FIG. 7 shows a schematic diagram of a circuit for driving a SPIM according to an embodiment of the present disclosure.

In one embodiment, as shown in FIG. 7, a circuit for driving the SPIM according to the present disclosure comprises a driver 1 and an alternating-current unit 2.

The driver 1 comprises a rectifying unit 11, a direct-current bus 12, a first inverter unit 13, a second inverter unit 14, and a first switch 15.

The rectifying unit 11 is connected to the direct-current bus 12, and is used to convert an input alternating-current power Vac into a direct-current power and output the direct-current power to the direct-current bus 12. Specifically, the rectifying unit 11 comprises a single-phase uncontrolled rectifying circuit, a single-phase PWM rectifier, a single-phase BOOST rectifying circuit, a totem-pole rectifying circuit, or a voltage multiplier rectifying circuit. Preferably, the rectifying unit 11 may comprise two-level rectifying circuits or three-level rectifying circuits, as long as the rectifying circuit is able to convert the input alternating-current power into the direct-current power. As an example, the input alternating-current power and an inductor are connected in series between two input terminals of the rectifying unit 11, and two output terminals of the rectifying unit 11 are respectively connected to two input terminals of the direct-current bus 12.

The direct-current bus 12 is respectively connected to the first inverter unit 13 and the second inverter unit 14, and is used to output the direct-current power to the first inverter unit 13 and the second inverter unit 14 respectively. Specifically, two output terminals of the direct-current bus 12 are respectively connected to two input terminals of the first inverter unit 13 and two input terminals of the second inverter unit 14, and are used for carrying the direct-current power generated by the rectifying unit 11 and outputting the direct-current power to the first inverter unit 13 and the second inverter unit 14. In an embodiment of the present disclosure, the direct-current bus 12 comprises electrolytic capacitors or batteries.

The first inverter unit 13 is connected to a first winding 31 of a SPIM 3 through the first switch 15, and is used to convert the direct-current power into the alternating-current power and output the alternating-current power to the first winding 31 through the first switch 15. Specifically, the two input terminals of the first inverter unit 13 are connected to the two output terminals of the direct-current bus 12, and two output terminals of the first inverter unit 13 are respectively connected to two terminals of the first winding 31 through the first switch 15. Therefore, when the first switch 15 is connected, the alternating-current power output by the first inverter unit 13 can drive the first winding 31. In an embodiment of the present disclosure, the first inverter unit 13 comprises two-level inverters or three-level inverters.

The second inverter unit 14 is connected to a second winding 32 of the SPIM 3, and is used to convert the direct-current power into the alternating-current power and output the alternating-current power to the second winding 32. Specifically, the two input terminals of the second inverter unit 14 are connected to the two output terminals of the direct-current bus 12, and two output terminals of the second inverter unit 14 are respectively connected to two terminals of the second winding 32 for driving the second winding 32. In an embodiment of the present disclosure, the second inverter unit 14 comprises two-level inverters or three-level inverters.

The alternating-current unit 2 comprises an input alternating-current power 21, a second switch 22 and a capacitor 23. The input alternating-current power 21 is connected to the first winding 31 through the second switch 22 to output the input alternating-current power 21 to the first winding 31. At the same time, the input alternating-current power 21 is output to the input terminal of the rectifying unit 11. Specifically, the input alternating-current power 21 may be provided by the grid, and is connected to the two terminals of the first winding 31 through the second switch 22 and the capacitor 23. Therefore, when the second switch 22 is connected, the input alternating-current power 21 can drive the first winding 31.

During the starting and variable-frequency control process of the circuit for driving the SPIM, the first switch 15 is connected, the second switch 22 is disconnected, the first winding 31 is driven based on the first inverter unit 13, the second winding 32 is driven based on the second inverter unit 14, and a current of the first winding 31 is ahead of that of the second winding 32 by a degree of 90°. The control method of connecting the SPIM and the driver can realize the variable-frequency operation of the motor. When the SPIM needs to run at industrial frequency, it can be switched from variable frequency to industrial frequency without any interruption. First, a driving voltage Vm of the second winding is adjusted to be consistent with the frequency and phase of the input alternating-current power Vac, the first switch 15 is disconnected, the second switch 22 is connected, the first winding 31 is driven based on the input alternating-current power Vac, and the second winding 32 is driven based on the driver, so as to realize the hot switching from variable frequency to industrial frequency. At this time, the driver only provides part of the energy required for motor operation. When a switch transistor of the first inverter unit is damaged, the first switch is disconnected, the second switch is connected, the first winding is driven based on the alternating-current unit, and the second winding is driven based on the second inverter unit. Therefore, the driver in the circuit for driving the SPIM according to the present disclosure can realize variable-frequency control and industrial-frequency control at the same time, thereby achieving the hot switching from drive control to grid industrial-frequency control, which ensures the reliability of circuit operation.

Figure 8:
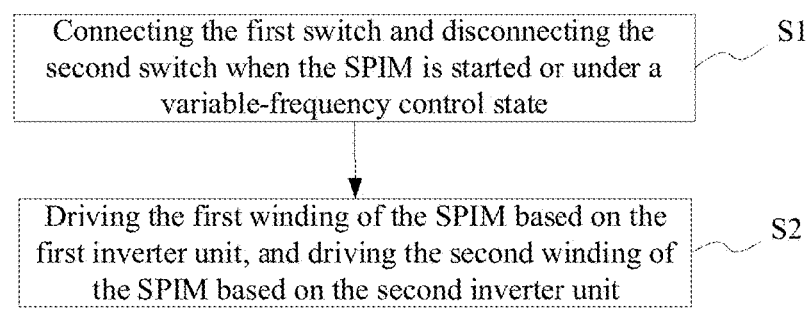
FIG. 8 shows a flow chart of a method for driving a SPIM according to an embodiment of the present disclosure.

In one embodiment, as shown in FIG. 8, a method for driving the SPIM according to the present disclosure is applied to any one of the circuits mentioned above, and comprises the following steps.

Step S1 includes connecting the first switch and disconnecting the second switch when the SPIM is started or under a variable-frequency control state.

Specifically, during the starting and variable-frequency control process of the circuit for driving the SPIM, the first switch is connected, the second switch is disconnected, the first winding is driven based on the first inverter unit, and the second winding is driven based on the second inverter unit.

Step S2 includes driving the first winding of the SPIM based on the first inverter unit, and driving the second winding of the SPIM based on the second inverter unit.

Specifically, the alternating-current power output by the first inverter unit drives the first winding directly. The alternating-current power output by the second inverter unit drives the second winding directly.

In an embodiment of the present disclosure, the SPIM can operate in variable-frequency and industrial-frequency modes. If the SPIM needs to operate in the industrial-frequency mode, the motor can first be driven to industrial frequency by two inverter bridges. After that, the first switch 15 is disconnected and the second switch 22 is connected to realize the hot switching of the SPIM from non-industrial frequency to industrial frequency. If the inverter bridge connected to the first winding is damaged, disconnecting the first switch 15, connecting the second switch 22, and controlling a current of the second winding to cooperate with the current of the first winding, so that the SPIM can still be started and operated at industrial frequency. This ensures the reliability of circuit operation.

Preferably, the method for driving the SPIM further comprises adjusting the current of both the first and second windings so as to generate a circular combined magnetic field, thereby reducing the damage and wear of the SPIM and improving the energy efficiency and service life of the SPIM.

In summary, the circuit for driving the SPIM according to the present disclosure can achieve soft start, variable-frequency control and industrial-frequency control of the SPIM. It has a small starting current and can adjust the current of the first and second windings to generate a circular combined magnetic field, resulting in small torque and speed fluctuations, high efficiency, reduced motor wear, and improved motor life. Additionally, it can also realize the hot switching from drive control to grid industrial-frequency control. Even if the switch transistor of the first inverter unit is damaged, cooperation between the second winding and the first winding can be controlled to form a circular magnetic field by connecting or disconnecting the first switch and/or the second switch, ensuring small starting current and industrial-frequency operation. Therefore, the present disclosure effectively overcomes various shortcomings in the existing technology and has high industrial utilization value.

The above-mentioned embodiments are for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the scope of the present disclosure.

What is claimed is:
1. A circuit for driving a single phase induction motor (SPIM), comprising a driver and an alternating-current unit; wherein the SPIM comprises a first winding configured as a main winding and a second winding configured as an auxiliary winding, driver comprises a rectifying unit, a direct-current bus, a first inverter unit, a second inverter unit and a first switch, and the alternating-current unit comprises an input alternating-current power, a second switch and a capacitor;

wherein the input alternating-current power is connected to an input terminal of the rectifying unit, the rectifying unit is connected to the direct-current bus, and the direct-current bus is respectively connected to the first inverter unit and the second inverter unit;

wherein the second winding is directly connected to the second inverter unit;

wherein the first switch is disposed between the first winding and the first inverter unit; and wherein the second switch is disposed between the first winding and the input alternating-current power, and the capacitor is disposed between the first winding and the second switch.

2. The circuit according to claim 1, wherein the first inverter unit and the second inverter unit comprise two-level inverters or three-level inverters.

3. A method for driving a SPIM, applied to the circuit according to claim 2, comprising:
connecting the first switch and disconnecting the second switch,
driving the first winding of the SPIM based on the first inverter unit, and driving the second winding of the SPIM based on the second inverter unit, to make the SPIM operate in a variable-frequency mode;
in response to a switch transistor of the first inverter unit connected to the first winding being damaged, disconnecting the first switch and connecting the second switch, driving the first winding based on the input alternating-current power and the capacitor, and driving the second winding based on the second inverter unit, to make the SPIM switch from the variable-frequency mode to an industrial-frequency mode.

4. The circuit according to claim 1, wherein the rectifying unit comprises a single-phase uncontrolled rectifying circuit, a single-phase PWM rectifier, a single-phase BOOST rectifying circuit, a totem-pole rectifying circuit, or a voltage multiplier rectifying circuit.

5. A method for driving a SPIM, applied to the circuit according to claim 4, comprising:
connecting the first switch and disconnecting the second switch,
driving the first winding of the SPIM based on the first inverter unit, and driving the second winding of the SPIM based on the second inverter unit, to make the SPIM operate in a variable-frequency mode;
in response to a switch transistor of the first inverter unit connected to the first winding being damaged, disconnecting the first switch and connecting the second switch, driving the first winding based on the input alternating-current power and the capacitor, and driving the second winding based on the second inverter unit, to make the SPIM switch from the variable-frequency mode to an industrial-frequency mode.

6. A method for driving a SPIM, applied to the circuit according to claim 1, comprising:
connecting the first switch and disconnecting the second switch,
driving the first winding of the SPIM based on the first inverter unit, and driving the second winding of the SPIM based on the second inverter unit, to make the SPIM operate in a variable-frequency mode;
in response to a switch transistor of the first inverter unit connected to the first winding being damaged, disconnecting the first switch and connecting the second switch, driving the first winding based on the input alternating-current power and the capacitor, and driving the second winding based on the second inverter unit, to make the SPIM switch from the variable-frequency mode to an industrial-frequency mode.

7. The method according to claim 6, wherein the first inverter unit and the second inverter unit comprise two-level inverters or three-level inverters.

8. The method according to claim 6, wherein the rectifying unit comprises a single-phase uncontrolled rectifying circuit, a single-phase PWM rectifier, a single-phase BOOST rectifying circuit, a totem-pole rectifying circuit, or a voltage multiplier rectifying circuit.

9. The method according to claim 6, wherein before disconnecting the first switch and connecting the second switch, the method further comprises:
adjusting a driving voltage of the second winding to be consistent with a frequency and phase of the input alternating-current power.

10. The method according to claim 6, wherein before disconnecting the first switch and connecting the second switch, the method further comprises:
driving the SPIM to the industrial-frequency mode by controlling the second inverter unit.

11. The method according to claim 6, wherein before disconnecting the first switch and connecting the second switch, the method further comprises:
controlling a current of the second winding to cooperate with a current of the first winding.

12. The circuit according to claim 1, wherein the first switch and the second switch are double-pole single-throw switches.

13. The circuit according to claim 12, wherein a first output terminal of the first inverter unit is connected to an input terminal of a first pole of the first switch, a first terminal of the first winding is connected to an output terminal of the first pole of the first switch, a second output terminal of the first inverter unit is connected to an input terminal of a second pole of the first switch, and a second terminal of the first winding is connected to an output terminal of the second pole of the first switch; wherein a first terminal of the input alternating-current power is connected to an input terminal of a first pole of the second switch, the first terminal of the first winding is connected to an output terminal of the first pole of the second switch, a second terminal of the input alternating-current power is connected to an input terminal of a second pole of the second switch, and the second terminal of the first winding is connected to an output terminal of the second pole of the second switch.

14. The circuit according to claim 13, wherein the capacitor is arranged between the output terminal of the second pole of the second switch and the second terminal of the first winding.

* * * * *